US011169381B2

(12) United States Patent
Ricks

(10) Patent No.: US 11,169,381 B2
(45) Date of Patent: Nov. 9, 2021

(54) HEAD-MOUNTED DISPLAY APPARATUS

(71) Applicant: Six15 Technologies, Henrietta, NY (US)

(72) Inventor: Theodore K. Ricks, Pittsford, NY (US)

(73) Assignee: Six15 Technologies, Henrietta, NY (US)

( * ) Notice: Subject to any disclaimer, the term of this patent is extended or adjusted under 35 U.S.C. 154(b) by 0 days.

(21) Appl. No.: 17/101,039

(22) Filed: Nov. 23, 2020

(65) Prior Publication Data

US 2021/0173212 A1    Jun. 10, 2021

Related U.S. Application Data

(60) Provisional application No. 62/944,020, filed on Dec. 5, 2019.

(51) Int. Cl.
  *G02B 27/01*    (2006.01)
  *G02B 27/09*    (2006.01)

(52) U.S. Cl.
  CPC ..... *G02B 27/0172* (2013.01); *G02B 27/0179* (2013.01); *G02B 27/0972* (2013.01); *G02B 2027/0138* (2013.01)

(58) Field of Classification Search
  CPC ........ G02B 2027/0138; G02B 27/0172; G02B 27/0176; G02B 27/0179; G02B 27/0972; G02B 23/02; G02B 27/14; G02B 27/144; G02B 5/04; A42B 3/042
  See application file for complete search history.

(56) References Cited

U.S. PATENT DOCUMENTS

| | | | |
|---|---|---|---|
| 3,804,495 A * | 4/1974 | Rayow | A42B 3/0426 359/834 |
| 4,269,476 A * | 5/1981 | Gauthier | G02B 23/10 2/422 |
| 8,467,133 B2 | 6/2013 | Miller | |
| 10,001,644 B2 * | 6/2018 | Border | G02B 26/0833 |
| 10,218,946 B1 * | 2/2019 | McCoy | G01J 3/14 |
| 10,244,223 B2 * | 3/2019 | Graziosi | H04N 13/172 |
| 10,406,526 B1 * | 9/2019 | McKellar | G02B 6/10 |
| 10,684,471 B2 * | 6/2020 | Weller | H04N 5/2254 |
| 10,732,037 B1 * | 8/2020 | Reid | G01J 3/0291 |
| 2005/0083591 A1 * | 4/2005 | Kobayashi | G02B 17/0816 359/831 |
| 2005/0180021 A1 * | 8/2005 | Travers | G02B 27/16 359/630 |

(Continued)

*Primary Examiner* — Dmitriy Bolotin
(74) *Attorney, Agent, or Firm* — Louis S. Horvath

(57) ABSTRACT

A head-mounted display apparatus for a viewer has an optical imager having a display generator that is energizable to emit image-bearing light in a first direction and a prism that is configured to redirect the generated light in a second direction that is toward the viewer's eye and orthogonal to within +/−30 degrees relative to the first direction. A housing is configured to form a sealed chamber that encloses at least the display generator of the optical imager and to expose at least a portion of the prism extended from the sealed chamber. A releasable coupling formed onto a cover element of the sealed chamber is configured to cooperate with a mounting fixture formed on headgear worn by the viewer for mounting the housing and suspending the exposed portion of the prism into a field of view of the viewer's eye.

19 Claims, 8 Drawing Sheets

(56) References Cited

U.S. PATENT DOCUMENTS

| | | | | |
|---|---|---|---|---|
| 2009/0040296 A1* | 2/2009 | Moscato | ............ | G02B 27/0176 |
| | | | | 348/53 |
| 2009/0168131 A1* | 7/2009 | Yamaguchi | .......... | G02B 27/017 |
| | | | | 359/13 |
| 2010/0066926 A1* | 3/2010 | Tanijiri | .............. | G02B 27/0172 |
| | | | | 349/11 |
| 2010/0254017 A1* | 10/2010 | Martins | .................. | G02B 7/002 |
| | | | | 359/631 |
| 2011/0050547 A1* | 3/2011 | Mukawa | ............ | G02B 27/0176 |
| | | | | 345/8 |
| 2011/0050655 A1* | 3/2011 | Mukawa | .............. | G02B 6/0018 |
| | | | | 345/204 |
| 2011/0248905 A1* | 10/2011 | Chosokabe | .......... | G02B 27/017 |
| | | | | 345/7 |
| 2012/0044571 A1* | 2/2012 | Mukawa | ............ | G02B 27/0172 |
| | | | | 359/630 |
| 2012/0306940 A1* | 12/2012 | Machida | .............. | G09G 3/3406 |
| | | | | 345/690 |
| 2014/0340286 A1* | 11/2014 | Machida | ............ | G02B 27/0172 |
| | | | | 345/8 |
| 2017/0023747 A1* | 1/2017 | Zbinden | ................ | G02B 6/3672 |
| 2017/0123204 A1* | 5/2017 | Sung | ................... | G02B 27/0103 |
| 2019/0250400 A1* | 8/2019 | Ricks | ..................... | G02B 27/14 |
| 2021/0011297 A1* | 1/2021 | Werjefelt | ............ | G02B 27/0172 |
| 2021/0120213 A1* | 4/2021 | Beni | ................. | G02B 27/0101 |
| 2021/0215950 A1* | 7/2021 | Ricks | ....................... | G02C 5/04 |

* cited by examiner

HEAD-MOUNTED DISPLAY APPARATUS

CROSS REFERENCE TO RELATED APPLICATIONS

The present application claims the benefit of U.S. Provisional application Ser. No. 62/944,020, provisionally filed on Dec. 5, 2019 entitled "HEAD-MOUNTED DISPLAY APPARATUS" in the name of Theodore K. Ricks, incorporated herein by reference in its entirety.

FIELD OF THE INVENTION

The present invention relates generally to wearable display devices and more particularly to a head-mounted display that provides image content at a finite focal distance.

BACKGROUND OF THE INVENTION

A number of solutions have been proposed for providing image content from wearable devices. Various types of eyewear apparatus have been described for displaying image content to a viewer. In some cases, these devices may be completely immersive, so that the viewer sees only images generated by the apparatus and has no ability to see the outside world when wearing the device, thus providing virtual reality (VR) display. However, there are many applications for which high degrees of visibility of the real world are of value, with generated images or messages presented in an unobtrusive manner, such as along the edge of the visual field or having portions that are visually superimposed against the real-world image content. Systems providing this capability are termed augmented reality (AR) or mixed reality displays.

Wearable display devices offer considerable promise for providing information and displaying complementary imagery that can improve safety, performance, and efficiency in a number of fields, including military, industrial, and medical applications, for example. These devices can help to direct a viewer to a particular task and enhance a viewer's understanding of visual content that lies in the field of view.

However, with many of the apparatus that have been proposed for wearable displays, the viewer is encumbered by the device in some way; this can be due to device size, bulkiness and discomfort, awkward component and image positioning, poor see-through visibility, poor image quality, eye fatigue, and other difficulties. Although many solutions for providing a more natural viewing experience have been outlined, and a number of advances toward improved image quality have been introduced, design factors may not be suitable for the intended use. For example, weight or form factors for many of these solutions may make it difficult to win broad-based acceptance for these devices, particularly for long-term use, or for demanding functions such as military or police applications.

One difficulty related to wearable optical displays relates to the need for adaptability to various types of headgear mounting arrangements. Conventional head-mounted display (HMD) designs tend to customize the optics for a specific mounting configuration, so that use of a particular optical imager design is limited to a particular type of helmet or other headgear. With this constraint, applying a particular design approach for other uses often necessitates substantial redesign of the optics, adding cost and complexity to the commercialization process. This can be particularly troublesome where there is a need to provide additional protection for optical components, such as for use in harsh environments, such as military and some industrial applications.

Thus, it can be appreciated that there is a need for a wearable device for display that is readily adaptable to numerous mounting arrangements, meeting the need for protection of components that is suitable for any number of use environments.

SUMMARY OF THE INVENTION

It is an object of the present disclosure to advance the art of head-mounted display. With this object in mind, the present disclosure provides a head-mounted display apparatus for a viewer comprising:

a) an optical imager having a display generator that is energizable to emit image-bearing light in a first direction and a prism that is configured to redirect the generated light in a second direction that is toward the viewer's eye and orthogonal to within +/−30 degrees relative to the first direction;

b) a housing that is configured to form a sealed chamber that encloses at least the display generator of the optical imager and further configured to expose at least a portion of the prism extended from the sealed chamber; and c) a releasable coupling formed onto a cover element of the sealed chamber and configured to cooperate with a mounting fixture formed on headgear worn by the viewer for mounting the housing and suspending the exposed portion of the prism into a field of view of the viewer's eye.

These and other aspects, objects, features and advantages of the present disclosure will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present disclosure, it is believed that the invention will be better understood from the following description when taken in conjunction with the accompanying drawings.

DETAILED DESCRIPTION OF THE INVENTION

Figure 1A:
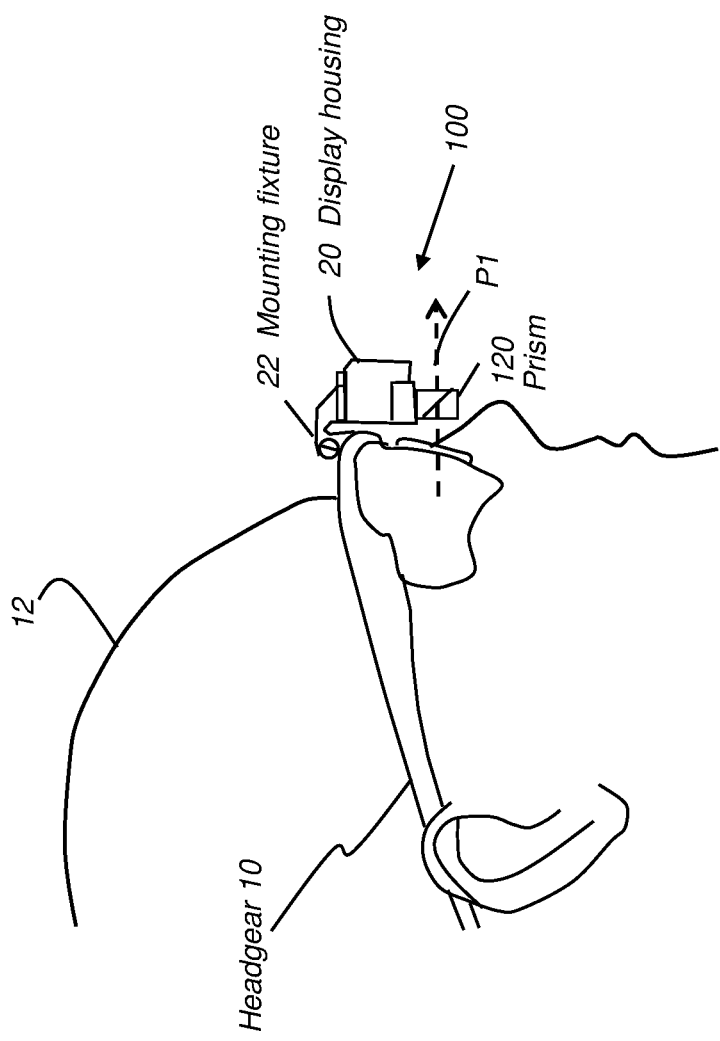
FIG. 1A is a side view that shows a display apparatus in a head-mounted application.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships or principles of operation or simply in order to fit components within the available space on the page. Some conventional components that would be needed for implementation of the described embodiments, such as various types of optical mounts, for example, are not shown in the drawings in order to simplify description of the invention itself. In the drawings and text that follow, like components are designated with like reference numerals, and similar descriptions concerning components and arrangement or interaction of components already described are omitted. Where they are used, the terms "first", "second", and so on, do not denote any ordinal or priority relation, but are simply used to more clearly distinguish one element from another.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus. The terms "upstream" and "downstream" as used herein have their conventional usage and refer to relative positions of light or light-conditioning or redirecting components as the light proceeds along an optical path.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the terms "user", "wearer", and "viewer" may be considered equivalent when referring to the person wearing the display apparatus described herein.

In the context of the present disclosure, the term "head-worn article" can include types of headgear, including head mounts, helmets, hard-hats, hats, caps, visors, and protective hoods, as well as eyeglasses, goggles, face shields, and various types of eyewear that seat against the viewer's head, with support along the sides or top of the viewer's head.

The term "optical axis" has its conventional meaning for each of the embodiments described subsequently. With rotationally symmetrical optics, the optical axis simply corresponds to the axis of rotational symmetry. However, with asymmetric optics, the optical axis is more generally defined as the path taken by a ray that is centered in the aperture of the light-concentrating optical component. For cylindrical optics, there may be an axis of symmetry with respect to a plane; this may or may not correspond to the optical axis. With a cylindrical optical device, the optical axis is in the plane where there is perceptible optical power orthogonal to the direction along which the cylindrical device is extended. For clarity, the term optical axis is used in the following description as relative to a single refractive or reflective optical component, rather than relative to the larger optical system that comprises multiple components. The more general term "optical path" is used herein to describe the path taken by a particular beam of light, from one component to the next in the optical system of the present disclosure.

With relation to dimensions given herein, the term "substantially" means within better than +/−12% of a geometrically exact dimension. Thus, for example, a first dimensional value is substantially half of a second value if it is in the range of from about 44% to about 56% of the second value. Positions in space are "near" each other or in close proximity when, relative to an appropriate reference dimension such as a radius of curvature, a focal point, a component location, or other point on an optical axis, distance dimensions are substantially the same, no more than about 12% apart, preferably within 5% or 1% or less distance from each other.

The term "prism" or "prism element" is used herein as it is understood in optics, to refer to a transparent optical element that is generally in the form of an n-sided polyhedron with flat surfaces upon which light from an external source is incident, or from which surfaces light exits, and that is formed from a transparent, solid material that refracts light. It is understood that, in terms of shape and surface outline, the optical understanding of what constitutes a prism is less restrictive than the formal geometric definition of a prism and encompasses that more formal definition. Moreover, the term "prism" may be used to describe a single, monolithic piece of substrate or to describe an assembly that uses an arrangement of prisms that may be cemented together or otherwise in optical contact with each other or, alternately, may be mounted to have a fixed air gap between them. Lensing features for converging or diverging light can be bonded to prism surfaces.

In the context of the present disclosure, a hermetic seal bonds two surfaces against each other to prevent ingress of moisture or particulate between the surfaces. Methods of hermetic sealing for a silicon-to-metal interface are known to those skilled in the mechanical arts.

Viewing devices for AR and other applications are preferably lightweight and compact, and offer a low-profile arrangement, suitable for mounting on a helmet or other headgear. Among particularly desirable optical characteristics for AR display that relate to image quality for both synthesized image content and the real-world field of view (FOV) are the following:
  (i) Good resolution.
  (ii) Suitable contrast and brightness.
  (iii) Visibility of real-world content. This means minimizing obstruction of the real-world FOV while at the same time providing generated image content of suitable quality for interpretation or readability.
  (iv) Minimum of display-generated image artifacts such as streaks, bands ghost images or color fringes.

Embodiments of the present disclosure provide versatile mounting arrangements for an optical imager that is configured for ready adaptability to various types of headgear worn by a viewer. By way of example, the side view of FIG. 1A shows headgear 10, such as a pair of safety glasses, on a viewer 12 having an optical imager assembly or optical engine 100 mounted thereon. Optical imager 100 suspends a prism 120 into the field of view (FOV) of viewer 12 along an optical path P1 that is defined by prism 120 and that lies along the line of sight. Prism 120 can be a compound prism or prism assembly, formed from two or more individual prisms that are bonded together to form a single monolithic component. Relative to path P1, prism 120 is a see-through component, transparent in order to allow viewing real-world scene content along path P1. Prism 120 can optionally act as a light guide, defining an imaging path that uses total internal reflection (TIR) to direct generated image-bearing light to the viewer's eye, with the light incident to prism 120 at an angle that is orthogonal to within +/−30 degrees of path P1. Optical imager 100 is fitted within a display housing 20 and is mounted from a mounting fixture 22 on headgear 10.

Optical imager 100 is sealed from moisture and from particulate ingress and provides an electronic interface for receiving power and signal content from an external source, such as a from processor or other device worn by the viewer or from some other source that is in signal communication with imager 100.

The head-worn article may or may not be protective headgear and can, in a very general aspect, be any type of eyewear or head covering capable of providing sufficient structural strength for supporting mounted displays or other optical components in position for viewing, in accordance with the present disclosure. In various embodiments, headgear 10 can be designed for military, industrial, medical support, or recreational use, for example.

Figure 1C:
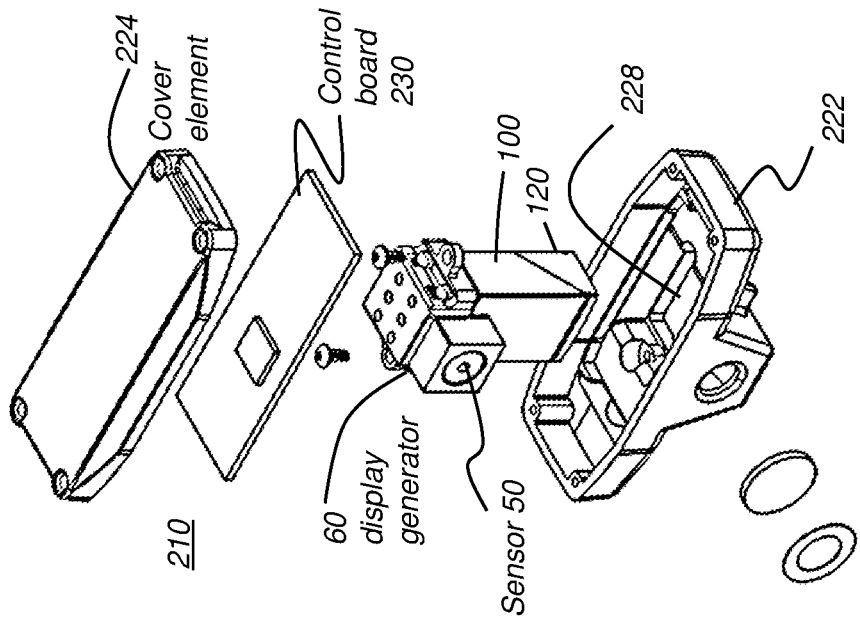
FIG. 1C is an exploded view showing exemplary components for the sealed optics module.
Figure 1B:
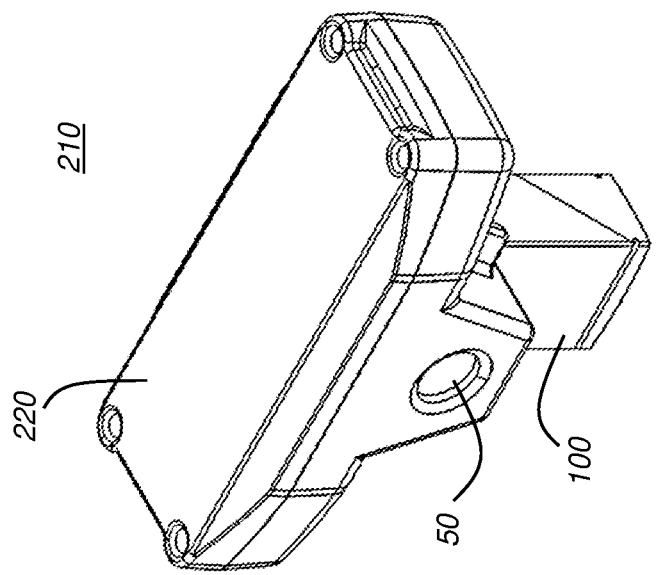
FIG. 1B is a perspective view of an optics module with a sealed optical imager according to an embodiment of the present disclosure.

FIG. 1B shows an embodiment for a display apparatus 210 that incorporates a sealed optical imager 100 and includes an optional sensor 50 within a sealed housing 220 for use as a head-mounted display. FIG. 1C is an exploded view showing exemplary components forming sealed display apparatus 210. Optional sensor 50, such as a camera or an inertial sensor, for example, can be packaged with optical imager 100. A sealed housing 220 has a top or cover element 224 and a bottom portion 222 that mates with cover element 224 and provides mounting and protection for optical imager 100 with a display generator 60 and optional sensor 50 and any associated filters, lenses, or other light-conditioning elements. An optional logic control board 230 or equivalent logic circuitry can also be fitted into housing 220. Bottom portion 222 of housing 220 has an orifice 228 through which prism 120 extends into the viewer FOV.

FIGS. 2A through 2D are perspective views that show aspects of an exemplary embodiment for a display apparatus 250 having an optical imager 100 with prism 120 suspended from housing 220. In the embodiment shown, display apparatus 250 is designed for rugged use, providing a measure of protection for the display optics and further providing sealed protection against moisture, particulate ingress and contamination, and other environmental factors. Display components for generating image-bearing light, generally described herein as display generator 60, can be enclosed within a housing; display components that direct this light to the viewer's optical path and field of view can then extend outward from the housing. Display generator 60 can be a liquid crystal array or other spatial light modulator having a separate light source or can be an electroluminescent device such as an OLED (organic light-emitting diode) display, for example. Sealing materials and techniques, including hermetic sealing techniques familiar to those in the art of protecting sensitive equipment can help to prevent exposure of the electronic imaging components sealed within the display housing, such as to dust, airborne chemicals, smoke, or moisture, while allowing portions of the prism and optical surfaces and components to be exposed along optical path P1.

Figure 2A:
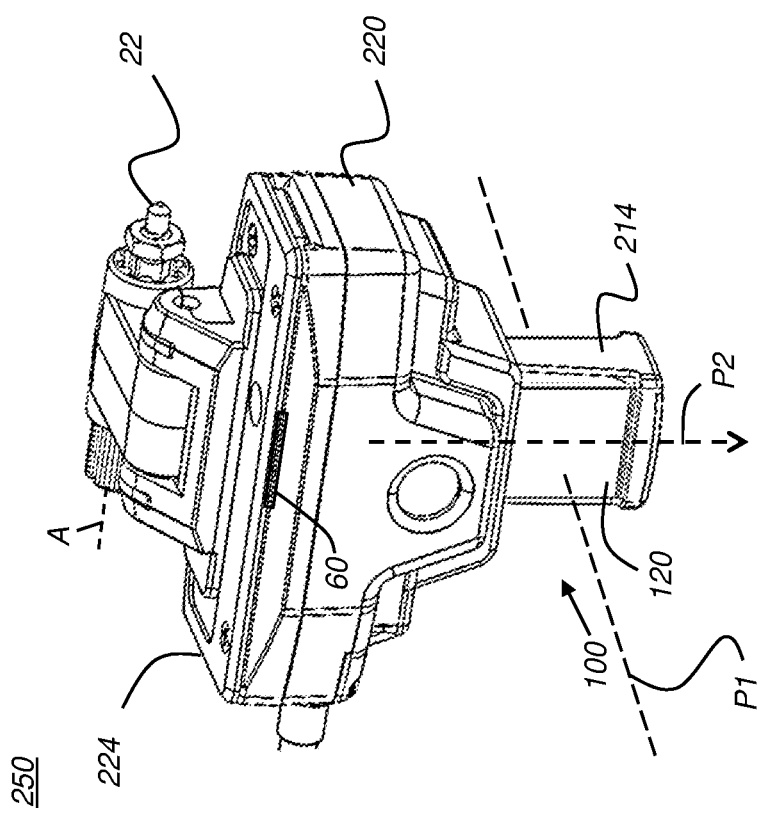
FIG. 2A is a perspective view showing an assembled display apparatus with a top portion configured to seat a mounting fixture that can be suitable for coupling to a helmet or other headgear.

FIG. 2A shows assembled display apparatus 250, with top portion 224 configured to seat an adjustable mounting fixture 22 that can be suitable for coupling to a helmet or other headgear, along with providing angular adjustment for prism 120, such as angular adjustment about an axis A outside the field of view. Prism 120 of optical imager 100 extends from housing 220 to conduct image-bearing light, emitted from the display generator 60 in a direction P2 that is substantially orthogonal to an optical path P1 that lies along the line of sight for the viewer's eye. Features of the embodiment shown include a protective boot, collar, or frame 214 that can encase side portions or edges of prism 120 that lie outside housing 220 without constraining the field of view along path P1. Protective collar 214 can be metal or a plastic or silicon material that helps to stabilize optical imager 100 position and alignment and to protect portions of the exposed components from contaminants, such as dust, dirt, or moisture, or to protect from impact or undesirable movement.

According to an alternate embodiment of the present disclosure, prism 120 can be replaced with a frame that suspends a beam splitter and a curved mirror, with an air gap between, at the corresponding optical positions shown within prism 120.

Figure 2B:
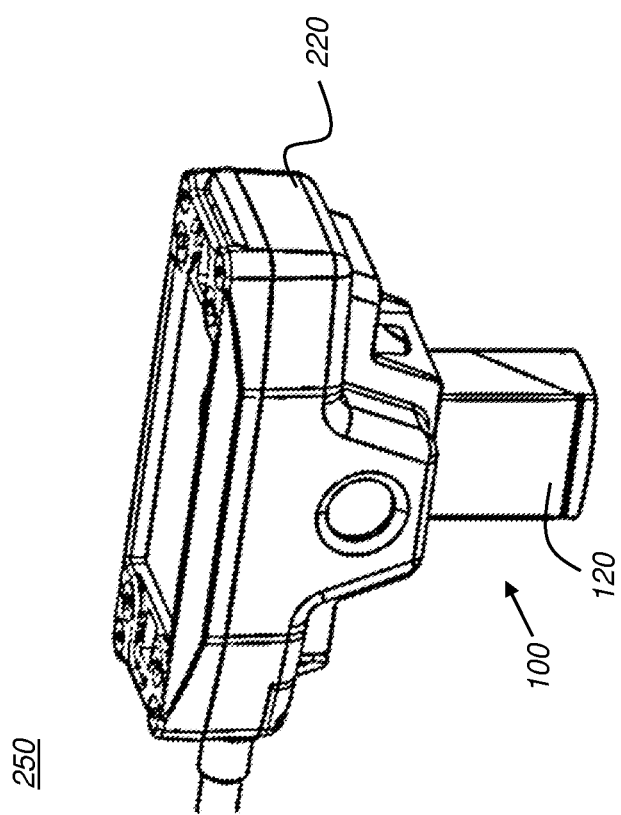
FIG. 2B is a top perspective view that shows an optics module with mounting and protective frame or collar accessories removed.

FIG. 2B is a top perspective view that shows optical imager 100 in housing 220 with mount 22, protective frame or collar 214, and top portion 224 of mount 22 removed. Top portion 224 provides the hardware that mounts optical imager 100 to a particular type of headgear 10. For alternate types of headgear 10, mount couplings can be readily interchanged by removing and replacing top portion 224 from housing 220.

Figure 2C:
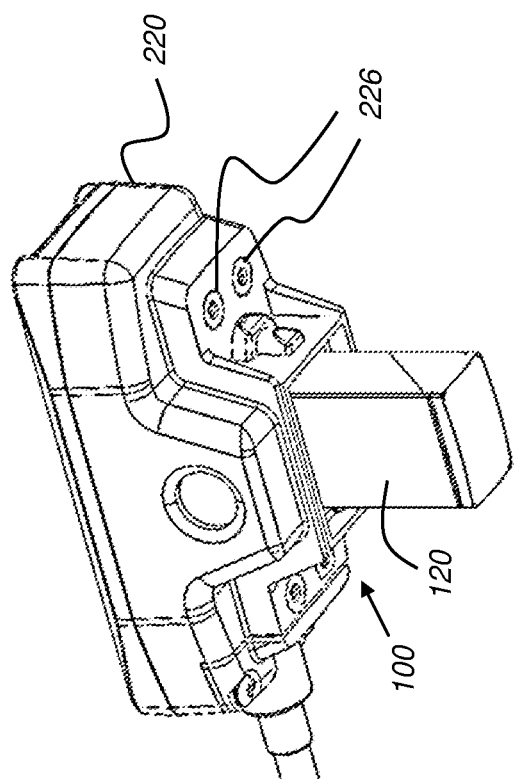
FIG. 2C is a bottom perspective view showing the extension of the optical imager from the optics module.
Figure 2D:
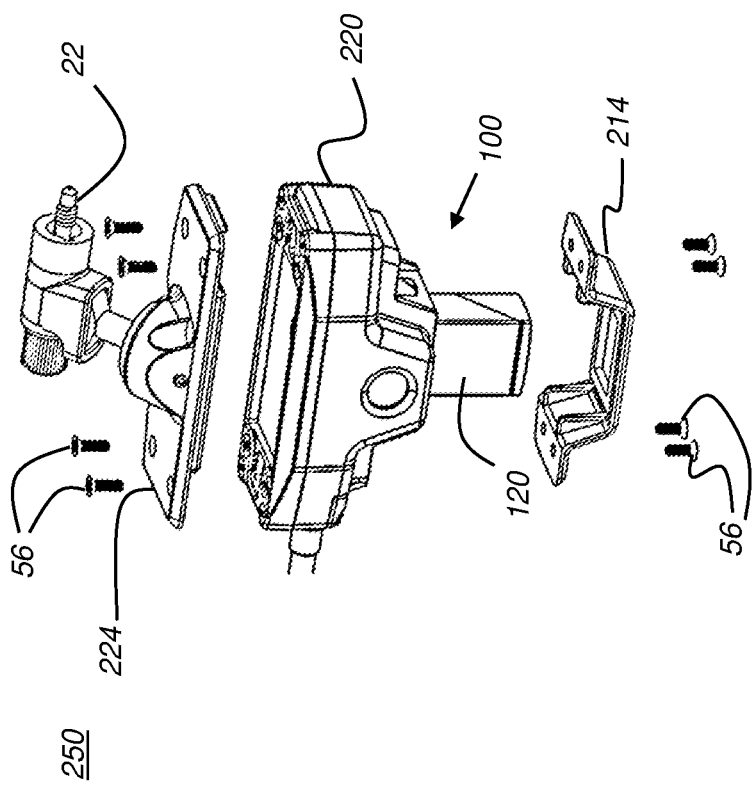
FIG. 2D is an exploded view that shows assembly details for a display apparatus.

FIG. 2C is a bottom perspective view showing the extension of optical imager 100 from housing 220. As shown in FIGS. 2C and 2D, pre-drilled holes 226 in housing 220 can be used for connecting frame or collar 214 for protecting optical imager 100. Optionally, frame or collar 214 can be provided as a separate component, uncoupled from housing 220.

FIG. 2D is an exploded view that shows assembly details for display apparatus 250. A variety of fasteners 56 can be used for attaching top portion 224 and mount 22 and for attaching collar 214. Additional fasteners (not shown) can also be used for mounting optical imager 100 within housing 220.

Housing 220 provides a mechanism for sealing internal components from moisture and dust, while allowing at least some protection for exposed components. Sealants applied at interfaces for covers, sealing gaskets employed between coupled components, and fasteners can provide high levels of protection for the packaged optics and electronics.

Figure 3:
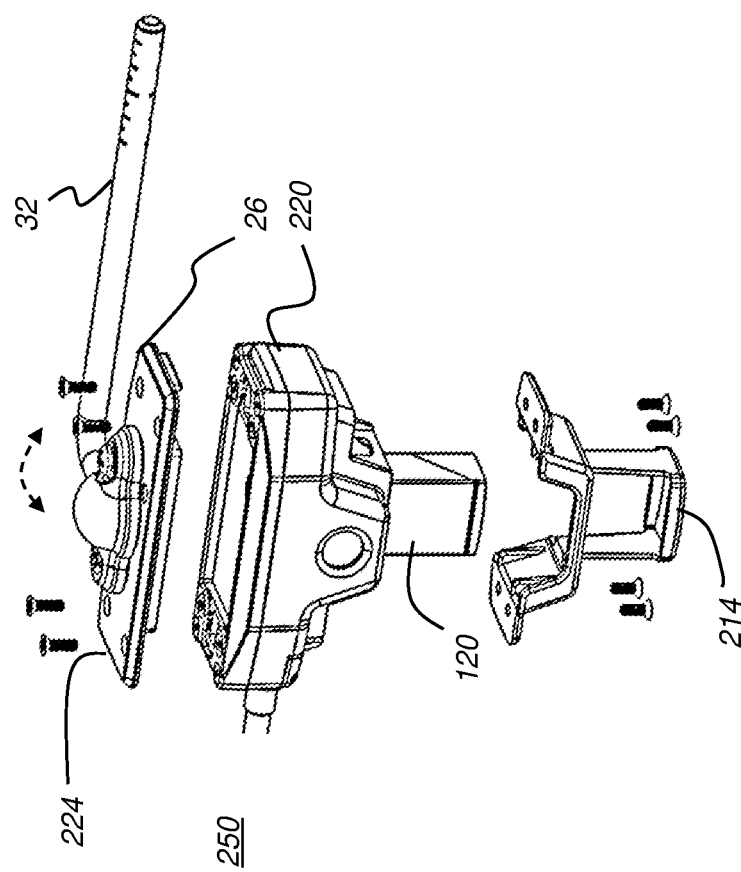
FIG. 3 is an exploded view that shows assembly details for an alternate embodiment of the display apparatus.

FIG. 3 is an exploded view that shows assembly details for an alternate embodiment of display apparatus 250. In the embodiment shown, a mounting fixture 26 uses a ball joint assembly arrangement with a connection feature 32 that provides a turnable shaft that re-orients to the left or right and slides into place within a mating cavity (not shown) that is provided by the headgear. The turnable shaft thus allows rapid reconfiguration for changing the mounting and use of the optical engine between left- and right-eye monocular viewing.

Figure 4:
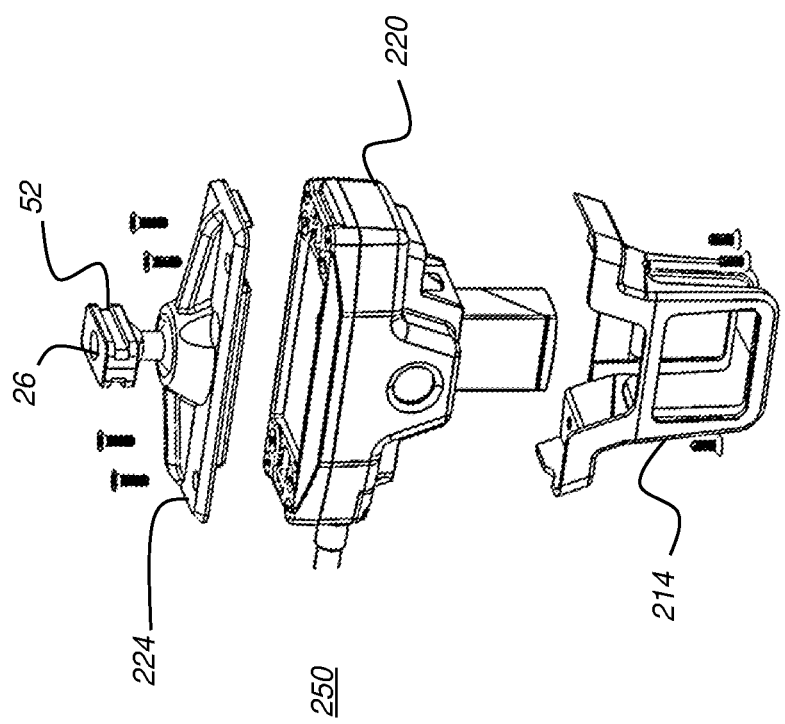
FIG. 4 is an exploded view that shows assembly details for yet another alternate embodiment of the display apparatus.

FIG. 4 is an exploded view that shows assembly details for yet another alternate embodiment of display apparatus 250. In the embodiment shown, mounting fixture 26 is configured with a ball joint and a type of insertable shoe 52 that seats within a corresponding bracket (not shown) that is fitted onto the headgear 10. The ball joint fitting allows some flexibility in prism positioning. An optional rugged mechanical boot or other device is shown as protective cage or collar 214.

Housing 220 can be configured to provide a measure of heat dissipation for display components, such as by drawing thermal energy away from optics imager 100. To perform this heat management function, housing 220 can be formed from a heat-conducting material such as metals, carbon, or composite materials, designed to draw heat away from the skin surfaces of the viewer for dissipation. Alternately, housing 220 can be formed from a heat-insulating material, such as from one of a number of polymers, ceramics, or epoxy foam, for example, used where there is a relatively low thermal load and area for heat dissipation is not easy to provide. Sealants used can be thermally conductive.

Embodiments of the present disclosure provide optics module packaging that can be readily adapted for head-worn display where minimal obstruction of the viewer field of view is a goal. Configurations described herein make it possible to reconfigure a head-mounted display for use in a range of applications, without requiring substantial redesign of headgear.

According to an embodiment of the present disclosure, there is provided a head-mounted display apparatus having an optics module that includes an optical imager with a display that projects image-bearing light in a first direction and a prism that is configured to redirect the generated light in a second direction that is orthogonal to within +/−30 degrees relative to the first direction and toward a viewer's eye. The optics module is sealed from moisture and particulate ingress. A housing is configured for attachment to the optics module and is configured to enclose at least a portion of the optical imager and to extend at least a portion of the prism into a field of view of the viewer's eye. A coupling attaches to the optics module, wherein the coupling configures the display apparatus for attachment to a head-worn article. The optics module further has features for attachment to the coupling. The control circuitry is provided on a circuit board that extends in a direction orthogonal to the direction of image-bearing light generated at the display. A protective collar extends from the housing around one or more edges of the prism of the optical imager. A sensor, such as a camera is mounted in the housing. A method for display provides a sealed optical imager that includes a display that projects image-bearing light in a first direction and a prism that is configured to redirect the generated light through a beam splitter and in a second direction that is orthogonal to the first direction and toward a viewer's eye. The optical imager is sealed within a housing that encloses the display and exposes the prism, extending the prism through an orifice in the housing for positioning within a field of view of the viewer's eye. A coupling is attached to a cover of the housing. The housing is configured for attachment to a head-worn article. The optical imager can be attached within the housing using mechanical fasteners. Attaching the coupling can include using fasteners. The coupling can have an arm element that connects to a fitting. A protective collar can extend around one or more edges of the prism.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

The invention claimed is:

1. A head-mounted display apparatus for a viewer comprising:
   a) an optical imager having a display generator that is energizable to emit image-bearing light in a first direction and a prism that is configured to redirect the generated light in a second direction that is toward the viewer's eye and orthogonal to within +/−30 degrees relative to the first direction;
   b) a housing that is configured to form a sealed chamber that encloses at least the display generator of the optical imager and further configured to expose at least a portion of the prism extended from the sealed chamber; and
   c) a releasable coupling formed onto a cover element of the sealed chamber and configured to cooperate with a mounting fixture formed on headgear worn by the viewer for mounting the housing and suspending the exposed portion of the prism into a field of view of the viewer's eye.

2. The apparatus of claim 1 further comprising a logic control circuit board enclosed within the housing, wherein the logic control circuit board extends in parallel to the cover element.

3. The apparatus of claim 1 further comprising a protective collar that extends from the housing around one or more exposed edges of the prism of the optical imager.

4. The apparatus of claim 1 further comprising a sensor that is mounted within the sealed chamber.

5. The apparatus of claim 4 wherein the sensor is a camera.

6. The apparatus of claim 1 further comprising one or more optical filters disposed within the sealed chamber.

7. The apparatus of claim 1 wherein the releasable coupling comprises a shaft that rotates from a pivot position on the cover element.

8. The apparatus of claim 1 wherein the releasable coupling comprises a shoe configured for a releasable fit into a corresponding bracket on the headgear.

9. A head-mounted display apparatus for a viewer comprising:
   a) an optical imager having a display generator that is energizable to emit image-bearing light in a first direction and a compound prism that is configured to redirect the generated light in a second direction that is toward the viewer's eye and orthogonal to within +/−30 degrees relative to the first direction;
   b) a housing that is configured to form a sealed chamber that encloses at least the display generator of the optical imager and a control logic circuit, wherein the housing is further configured to expose, within the viewer field of view, at least a portion of the compound prism that extends from an orifice in the housing;
   c) a releasable coupling formed onto a cover element of the sealed chamber and configured to cooperate with a mounting fixture formed on headgear worn by the viewer for mounting the housing and suspending the exposed portion of the prism into the viewer field of view; and
   d) a sensor that is mounted within the sealed chamber and generates a signal related to a sensed condition in the field of view.

10. The apparatus of claim 9 wherein the sensor is a camera.

11. The apparatus of claim 9 wherein the display generator is an electroluminescent device.

12. The apparatus of claim 9 wherein the releasable coupling formed onto the cover element comprises a ball joint.

13. A method for display to a viewer, the method comprising:
   a) disposing, within a housing, a display generator that is energizable to emit image-bearing light in a first direction;
   b) extending, from the housing, a prism that is configured to guide the emitted light to a folding surface that redirects the emitted light in a second direction that is orthogonal to within +/−30 degrees relative to the first direction;
   and
   c) sealing the housing to enclose the display generator and form a sealed chamber by attaching a cover, wherein the cover further includes a coupling configured for releasable attachment to headgear worn by the viewer.

14. The method of claim 13 wherein attaching the cover comprises using mechanical fasteners.

15. The method of claim 13 further comprising attaching the coupling to the viewer headgear for displaying an image within a field of view of the viewer.

16. The method of claim 13 further comprising extending a protective collar around one or more exposed edges of the prism.

17. The method of claim 13 further comprising disposing an optical filter within the sealed housing.

18. The method of claim 13 further comprising providing, on the cover, an adjustment for an angle of the extended prism.

19. The method of claim 18 wherein the adjustment is about an axis that lies outside a field of view of the viewer.

* * * * *